United States Patent
Brissman et al.

(10) Patent No.: US 8,032,239 B2
(45) Date of Patent: Oct. 4, 2011

(54) PRODUCT FOR CONTROLLING BEHAVIOR OF CONTROL SIGNALS FROM A CERTIFIED APPLICATION

(75) Inventors: Jan Brissman, Limhamn (SE); Christer Scheja, Lund (SE); Lars-Göran Hallgren, Malmö (SE)

(73) Assignee: Schneider Electric Buildings AB, Malmö (SE)

( * ) Notice: Subject to any disclaimer, the term of this patent is extended or adjusted under 35 U.S.C. 154(b) by 847 days.

(21) Appl. No.: 11/887,731

(22) PCT Filed: Apr. 19, 2007

(86) PCT No.: PCT/EP2007/003413
§ 371 (c)(1),
(2), (4) Date: Oct. 24, 2007

(87) PCT Pub. No.: WO2007/121911
PCT Pub. Date: Nov. 1, 2007

(65) Prior Publication Data
US 2009/0030533 A1    Jan. 29, 2009

Related U.S. Application Data

(60) Provisional application No. 60/794,098, filed on Apr. 24, 2006.

(30) Foreign Application Priority Data

Apr. 21, 2006 (SE) .................................. 0600878

(51) Int. Cl.
*G06F 19/00* (2011.01)
(52) U.S. Cl. ............ 700/79; 700/81; 700/292; 713/167; 713/193
(58) Field of Classification Search ............... 700/81, 700/292; 713/167, 193
See application file for complete search history.

(56) References Cited

U.S. PATENT DOCUMENTS

| 5,892,900 A * | 4/1999 | Ginter et al. ................ 726/26 |
| 6,216,956 B1 * | 4/2001 | Ehlers et al. ................ 236/47 |
| 2004/0025011 A1 | 2/2004 | Azema et al. |
| 2006/0015936 A1 | 1/2006 | Illowsky et al. |

FOREIGN PATENT DOCUMENTS

EP   1 217 850 A1   6/2002

OTHER PUBLICATIONS

"Directive 2002/91/EC of the European Parliament and of the council on the energy performance of buildings." Dec. 16, 2002.*
International Search Report, Aug. 13, 2007.
Written Opinion of the International Searching Authority.

* cited by examiner

*Primary Examiner* — Michael D Masinick
(74) *Attorney, Agent, or Firm* — Buchanan Ingersoll & Rooney PC

(57) ABSTRACT

A product for controlling physical properties including data processing means with inputs and outputs is provided. The product has approved bounds of behavior. At least one of the outputs includes a control signal disposed to be output by the product. The product is arranged to control an entity for implementing building functionality. The data processing means includes a processing control means, and a software including at least one application, and having a certificate uniquely associated with the application such that authenticity relating to building regulation, standard or directive of the application can be checked. The processing control means includes means for confirming the application by verifying the certificate associated with the application, and means for checking functions of the application and functions of the product as a whole, such that the control signal does not violate the approved bounds of behavior of the product when the application is executed.

20 Claims, 2 Drawing Sheets

PRODUCT FOR CONTROLLING BEHAVIOR OF CONTROL SIGNALS FROM A CERTIFIED APPLICATION

The benefit is claimed under 35 U.S.C. §119(a)-(d) of Swedish Application No. 0600878-3, filed Apr. 21, 2006, and under 35 U.S.C. §119(e) of U.S. Provisional Application No. 60/794,098 filed Apr. 24, 2006.

TECHNICAL FIELD

The present invention relates to a product for controlling physical properties, a device having such a product, and a system comprising a plurality of such devices together with devices for building related functionality and a means for defining approved bounds of behaviour of the devices for controlling.

BACKGROUND OF THE INVENTION

Systems for implementing building related functionality are often complex systems, and it is of particular importance for reliability and energy performance that elements of the complex systems are co-operating in a satisfactory manner. During start-up after building or upgrading a system, a lot of issues will show up. This is costly to cope with, and is time consuming. Although experienced craftsmen are handling the start-up, not all issues will be identified, and these issues can then for a long time degrade performance of the system. To minimise these issues, especially for energy reasons, there has been a given a number of standards, regulations and directives to improve compatibility of equipment used in these kinds of systems. However, due to the often existing large complexity of the systems, issues still remain due to overlooking effects of the aggregate function of the elements of the system, especially when the elements per se becomes more and more complex, e.g. with downloadable applications. Therefore, there is a problem with existing solutions how to ensure compatibility among this type of equipment.

SUMMARY OF THE INVENTION

In view of the above, an objective of the invention is to solve or at least reduce the problems discussed above. In particular, an objective is to ensure that approved bounds of behaviour are achieved.

According to a first aspect of the present invention, there is provided a product for controlling physical properties comprising data processing means with inputs and outputs, wherein said product has approved bounds of behaviour, wherein at least one of said outputs comprises at least one control signal disposed to be output by said product, and said data processing means comprises a processing control means; and a software comprising at least one application, and having a certificate uniquely associated to said at least one application, wherein said processing control means further comprises means for confirming said at least one application by means for verifying said certificate, and means for checking functions of the application and the data processing means in co-operation such that said at least one control signal does not violate the approved bounds of behaviour of the product.

By the provided ability of verifying the certificate of the software, it is possible to ensure that the at least one application has properties according to specifications of the issuer of the certificate, and then by the ability to check the functions of the application, whose properties are known for sure if the verification gives a positive result, and the data processing means in co-operation, i.e. the function of the product as a whole, such that control signals from the product are within the bounds of behaviour. This is advantageous for example when other equipment to be controlled by the product demands specified behaviour, when the product is a part of a system, whose function relies on specified behaviour of devices of the system, or when the product is to control a certain specified critical task.

The processing control means may comprise hardware interfacing software and said means for confirming and checking may then be implemented in said hardware interfacing software.

The processing control means may comprise hardware, wherein said means for confirming and checking then may be implemented in the hardware of said processing control means.

The means for verifying said certificate may comprise a check sum calculator, and/or said means for verifying said certificate may comprise hash algorithm means.

The processing control means may comprise data base means having information on certified applications, properties of said product, and said approved bounds of behaviour. Alternatively, the processing control means may comprise communication means having access to at least one of information on certified applications, properties of said product, and said approved bounds of behaviour. Alternatively, a mix between these solutions may be provided, such that said processing control means comprises communication means having access to at least one of information on certified applications, properties of said product, and said approved bounds of behaviour, and data base means having at least one of information on certified applications, properties of said product, and said approved bounds of behaviour, such that information on certified applications, properties of said product, and said approved bounds of behaviour are available.

The certificate may comprise at least one of information on certified applications, properties of said product, and said approved bounds of behaviour. The certificate may comprise a unique identifier, time of creation, purpose of application, author, information on critical inputs, information on critical outputs, or a mark identification, or any combination thereof.

The product may comprise an output having an output signal indicating results of the checking and verification operations of said processing control means. The indication may be a visual indicator close to the product, such as a light emitting diode, or information on the signal to be transmitted by wire or wirelessly to e.g. an external management tool.

The product may further comprise a second software comprising at least one application, and having a second certificate uniquely associated to said at least one application, wherein said means for confirming is disposed for verifying said second certificate associated to said at least one application of said second software, and said means for checking is disposed for checking functions of the application of the second software in co-operation with the application of the software and the product such that said at least one control signal does not violate the approved bounds of behaviour of the product. In a similar way, the product may have further softwares with certificates.

According to a second aspect of the present invention, there is provided a device comprising a product according to the first aspect of the invention disposed for controlling building related functionality.

In this context, control in relation to heating, ventilation, and air conditioning (HVAC), security, lighting, asset management, or other facility management control is referred to as 'controlling building related functionality'. It should be noted that any of the aspects of the present invention may be particularly adapted for controlling building related functionality.

Advantages of this is provision of a controller device for building related functionality, such as heating, ventilation, air-conditioning, lighting, security functions, access control functions, surveillance, elevators, escalators, fire alarm systems, blinds, shutters, louvers, etc., with the advantages demonstrated for the first aspect of the present invention.

The device may comprise a further application. This application does not need to be certified, for example if it implements a function which is not related to critical output from the device, but may also be a certified application as those described above.

According to a third aspect of the present invention, there is provided a system comprising a plurality of devices according to the second aspect of the invention, further comprising means for defining said approved bounds of behaviour and at least one building related functionality device to be controlled by at least one of said devices.

An advantage of the system is that management of the approved bounds of behaviour of the elements of the system is provided, thus ensuring proper function of the system as a whole.

The at least one building related functionality device may be a valve, an electric motor, a radiator, an actuator, a contactor, a curtain, a shutter, a blind, a louver, a dimmer, a door or gate lock, a power outlet, a camera, or a turnstile, or any combination of these elements.

The means for defining said approved bounds of behaviour may be disposed to define said bounds according to regulations of European Energy Performance of Buildings Directive. The means for defining said approved bounds of behaviour may be arranged to provide an EUBAC mark to said certificate.

An advantage of this is provision of well defined behaviour of elements of the system according to these regulations, which in turn will make it easier when designing and managing the system. A further advantage is that elements from different providers or manufacturers used in a system will be able to co-operate in a more efficient and/or reliable way.

In general, the means for checking functions of the application and processing means in co-operation, such that output signals do not violate approved bounds of behaviour, may comprise a test program inputting predetermined input signals to the application, whereby the output signals can be checked. Alternatively, a remote test program is accessed, in which an approved mirror control mechanism provides correct output signals, which are checked against the provided output signals of the actual controller. Thus, it is assured that the control mechanism as a whole has approved bounds of behaviour for ensuring reliability, compatibility, and/or efficiency. Optionally, the control object, e.g. a valve, motor, heater, etc., controlled by the control mechanism may be involved in the test procedure, such that response to control activities also can be included in the test of operation.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
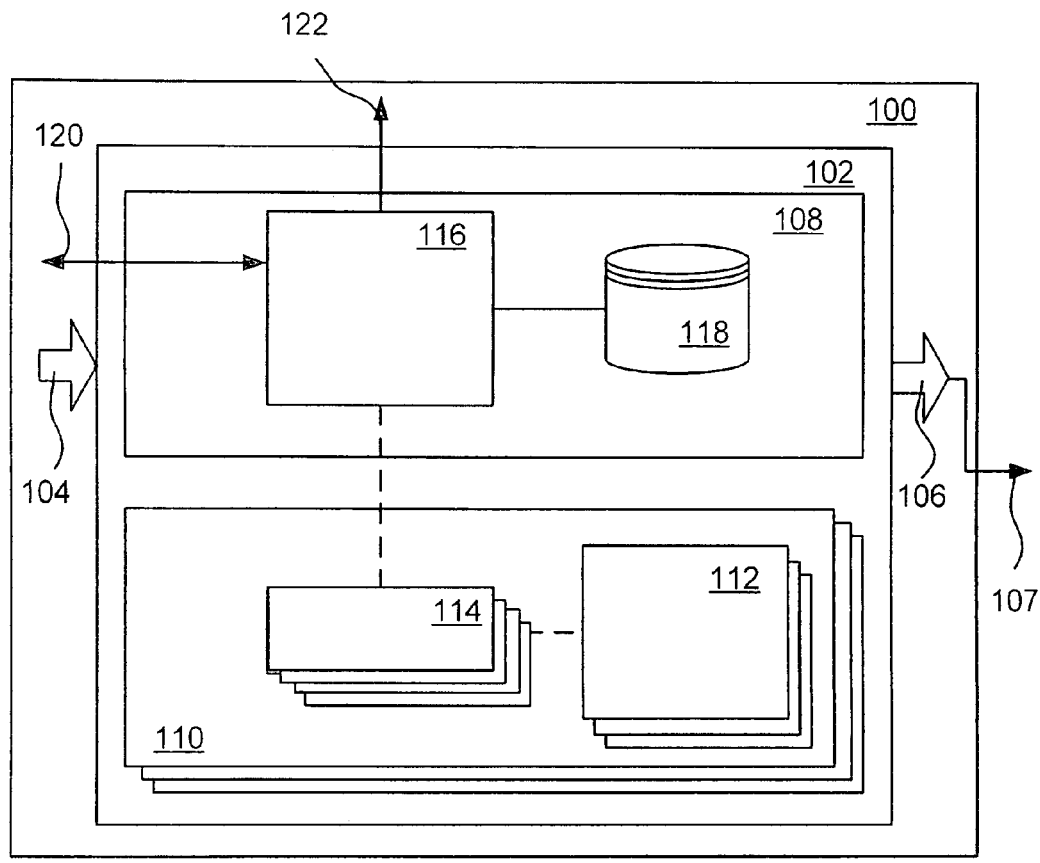
FIG. 1 schematically illustrates a product for controlling physical properties according to an embodiment of the present invention.

FIG. 1 schematically illustrates a means for controlling. The means is preferably a product 100 to be included in e.g. a controller device for enhancing functionality. The product 100 is arranged for controlling physical properties by providing control signals to entities for implementing building related functionality. The product 100 can be implemented in a single unit or be a distributed bunch of means performing the functions of the product 100.

To be able to fit the product into a system of entities for implementing building related functionality and into a building management system, the product has approved bounds of behaviour for ensuring reliability, compatibility, and/or efficiency. The bounds of behaviour can for example emanate from test procedures and certification of controller products. Examples of this are EN 12098-1 to EN 12098-5, prEN15500, EN15500, and regulations provided by European Building Automation Controls Association (EUBAC), which provides for implementing European Energy Performance of Buildings Directive (EPBD). Further, there are standards for Electronic Individual Zone Control Equipment. Further, the invention is applicable for certification of alarm systems for access control and security functions. Examples of this are the EN specifications EN 50131, which is for intrusion systems, EN 50132, which is for CCTV surveillance systems, and EN 50133, which is for access control systems. Thus, by providing bounds of behaviour for the product 100, it is facilitated to ensure that regulations, standards, directives, etc. are followed.

The product 100 comprises data processing means 102 provided with inputs 104 and outputs 106, which can be both external and internal. Among the outputs 106, there is at least one control signal 107 to be output for controlling an entity for implementing building functionality.

The data processing means 102 comprises a processing control means 108 and at least one software 110. The software 110 comprises at least one application 112 and at least one certificate 114. The certificate is uniquely associated with the application 112, e.g. by a hash algorithm or a check sum, such that the authenticity of the application 112 can be checked. For checking this authenticity, the processing control means 108 further comprises means for confirming the application 112 by means 116 for checking the certificate 114 and its associated application 112, logically and functionally as depicted by dashed line in FIG. 1. This can be performed by a check sum calculator (not shown) or a hash algorithm means (not shown). Here it should be noted that there can be a one-to-one relationship between certificate and application, but it is possible that a certificate is related to a group of applications. There is also a possibility that an application has relations to several certificates. Examples of this are when an application is certified according to more than one regional standard, or if the application operates within several fields being subject to different standards.

The processing means further comprises means (not shown) for checking functions of the application 112 and the processing means 102 in co-operation such that e.g. control signal 107 does not violate the approved bounds of behaviour of the product 100 when executing the application 112. The processing means 102 and processing control means 108 can further comprise other means, such as random access memory (RAM), input and output interfaces, power supply, etc., which are commonly used in data processing equipment, but for clarity reasons are not shown in FIG. 1.

The processing control means 108 can further comprise data base means 118, internally or externally, having information on certified applications, on properties of the product, and on the approved bounds of behaviour. The processing control means 108 can further be arranged to communicate via a wired or wireless communication link 120 to gain access to e.g. information on certified applications, on properties of the product, and on the approved bounds of behaviour to the means 116 for checking. This can be accessed from e.g. a server of a building management system. Any combination of access to these types of information from a storage means 118 of the processing control means 108 and/or from an external server is possible, and the information or parts of the information can also be included in the certificate 114. A particular advantage of having the information in the certificate 114 is that the certificate is protected from being corrupt by the checking of the certificate as described above. This provides for the information being correct.

Upon check of the applications and certificates, the result of the check can be provided on an output 122, which can be connected to an indication means, a user interface, and/or a facility management system.

As indicated in FIG. 1, the data processing means 102 can have one or a plurality of softwares 110, each comprising one or a plurality of applications 112. This is for example applicable where an additional software pack has been downloaded to the product 100 comprising one or a pack of applications in addition to existing software in the product. Thereby, the invention enables that the downloaded software and its applications are checked to be compatible to the product and its prior software, since this is certified to be compatible according to prior testing and certification of the applications, whereby a digital mark is provided in the certificate associated to the applications which proves that the applications have passed the testing. The digital mark can comprise a reference id having an association to a particular certification. The certificate can also comprise information on which products the applications have been tested for, and which other applications they are tested for co-operation with. The mark can for example be a digital eu.bac mark for proving that certification is performed according to rules of the eu.bac mark scheme for products and systems for home and building automation, that includes conformity test of the products, checking of manufacturer's quality management system for fulfilment of relevant product line, inspection of production location, and market surveillance. Other examples can be certifications on equipment to be used for dangerous substances and in explosive atmospheres, such as ATEX 137 Workplace Directive 1999/92/EC, certifications on fire protection and fire extinguishing equipment, or certifications on refrigeration equipment.

Figure 2:
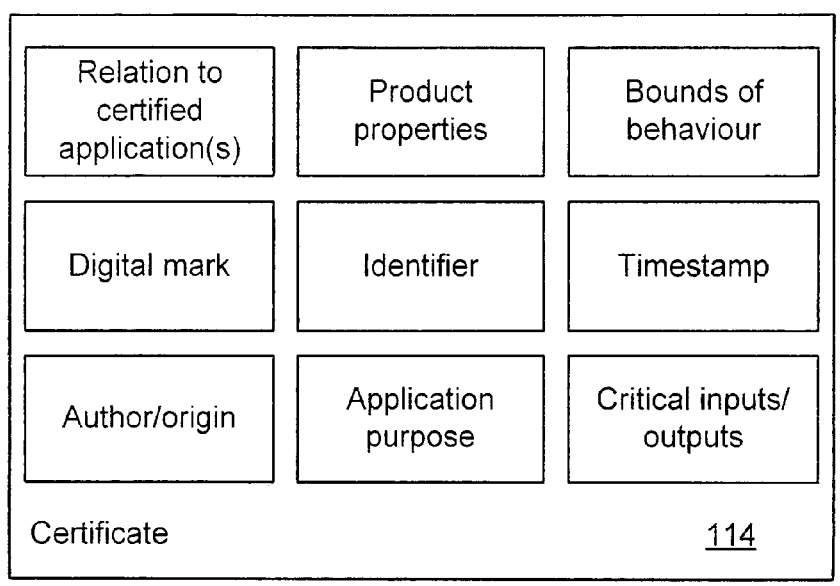
FIG. 2 schematically illustrates what kind of information that can be included in a certificate according to an embodiment of the present invention.

FIG. 2 illustrates what kind of information that can be included in the certificate 114. This can be any combination of relation to certified applications, product properties for applicable products, bounds of behaviour for these products, an identifier, a timestamp indicating time of creation of the certificate and/or the application, the author or origin of the application, the purpose of the application, to be able to detect if the application is used in a context that it is not intended for, and of critical inputs and outputs to be considered for the checking of functions. The certificate 114 preferably also comprises a digital mark, that is a special authentication tag certifying that the associated application complies with a certain regulation, standard, directive, etc.

Figure 3:
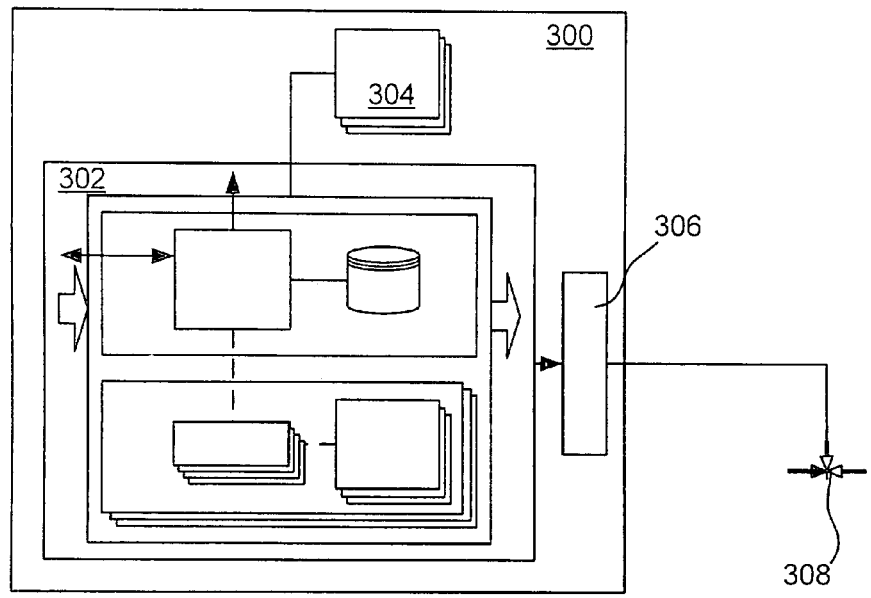
FIG. 3 schematically illustrates a device comprising a product as the one depicted in FIG. 1.

FIG. 3 illustrates a device 300 comprising a product 302 as the one depicted in FIG. 1. The device 300 can further comprise means that is normally found in a controller unit for building functionality, such as a casing, power supply, indicators or a user interface, communication means for wired and/or wireless communication, etc., which for clarity reasons are not shown in FIG. 3. The device 300 can optionally comprise one or more further applications 304 not being obliged for testing, and thus not being certified, according to any regulations, standards, directives. The device 300 can also comprise an interface 306 for adapting signal levels, protocols, etc. of provided control signals to be suited for controlling entities 308 for implementing building related functionality, here depicted as a valve, but which can be one or more entities such as lighting devices, power control means, ventilation equipment, heaters, air conditioning means, access control means, security means, etc.

Figure 4:
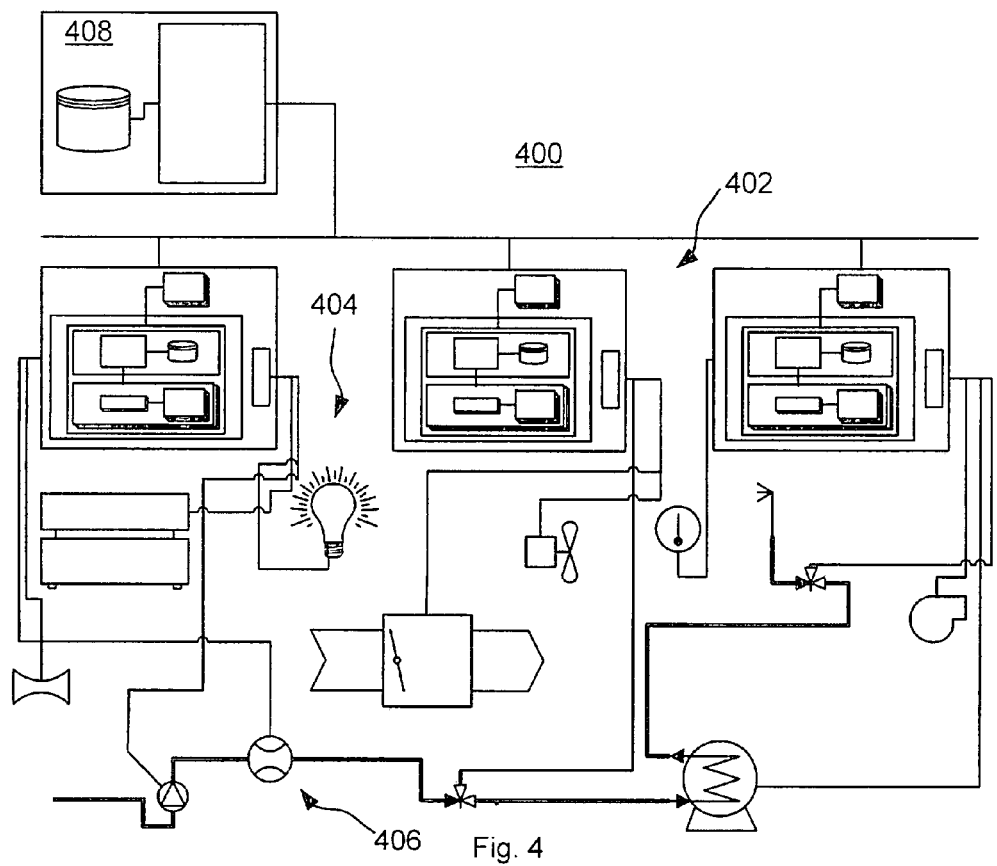
FIG. 4 schematically illustrates a system comprising a plurality of controller devices similar to the device depicted in FIG. 3, controlling a plurality of devices for building related functionality, and means for defining approved bounds of behaviour of the controller devices according to an embodiment of the present invention.

FIG. 4 illustrates a system 400 comprising a plurality of controller devices 402, similar to the device depicted in FIG. 3, controlling a plurality of devices 404 for building related functionality, and means 408 for defining approved bounds of behaviour of the controller devices 402. In FIG. 4, control connections between the elements are illustrated as lines, which should be interpreted as being wired and/or wireless signalling between the elements, and other physical connections are illustrated as bold lines. The controller devices 402 can also have inputs from sensors 406 for measurement, control, and/or supervision. These can be sensors for temperature, humidity, fluid flow, voltage, current, alarm systems, number of revolutions, etc.

The means 408 for defining approved bounds of behaviour can be a part of a central unit for building management system, a connected part provided by the vendor of the system or an institute providing the regulations, standards, or directives, or one or more control units having the role of providing the approved bounds of behaviour. It can also be a dedicated server providing applications and associated certificates in the system 400.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A product for controlling physical properties of an entity for implementing building functionality, the product comprising data processing means with inputs and outputs, wherein said product has approved bounds of behaviour, wherein at least one of said outputs comprises at least one control signal disposed to be output by said product, and wherein said data processing means comprises
   a processing control; and
   a software comprising at least one application, and having a certificate uniquely associated with said at least one application for certifying that the at least one application complies with at least one of building regulation, standard or directive of said at least one application,
   wherein the processing control confirms said at least one application by verifying said certificate associated with said at least one application, and
   wherein the processing control checks functions of said at least one application and functions of the product as a whole, such that said at least one control signal does not violate the approved bounds of behaviour of the product when said at least one application is executed.

2. The product according to claim 1, wherein said processing control means comprises hardware interfacing software and said means for confirming and checking are implemented in said hardware interfacing software.

3. The product according to claim 1, wherein said processing control means comprises hardware, wherein said means for confirming and checking are implemented in the hardware of said processing control means.

4. The product according to claim 1, wherein said means for verifying said certificate comprises a check sum calculator.

5. The product according to claim 1, wherein said means for verifying said certificate comprises hash algorithm means.

6. The product according to claim 1, wherein said processing control means comprises data base means having information on certified applications, properties of said product, and said approved bounds of behaviour.

7. The product according to claim 1, wherein said processing control means comprises communication means having access to at least one of information on certified applications, properties of said product, and approved bounds of behaviour.

8. The product according to claim 1, wherein said processing control means comprises
   communication means having access to at least one of information on certified applications, properties of said product, and said approved bounds of behaviour, and
   data base means having at least one of information on certified applications, properties of said product, and said approved bounds of behaviour,
   such that information on certified applications, properties of said product, and said approved bounds of behaviour are available.

9. The product according to claim 1, wherein said certificate comprises at least one of information on certified applications, properties of said product, and said approved bounds of behaviour.

10. The product according to claim 1, wherein said certificate comprises a unique identifier, time of creation, purpose of application, author, information on critical inputs, information on critical outputs, or a mark identification, or any combination thereof.

11. The product according to claim 1, comprising an output having an output signal indicating results of the checking and verification operations of said processing control means.

12. The product according to claim 1, further comprising
   a second software comprising at least one further application, and having a second certificate uniquely associated with said at least one further application,
   wherein said means for confirming is disposed for verifying said second certificate associated with said at least one further application of said second software, and
   wherein said means for checking is disposed for checking functions of the application of the second software in co-operation with said at least one further application of the software and the product such that said at least one control signal does not violate the approved bounds of behaviour of the product.

13. A device comprising a product according to claim 1, disposed for controlling building related functionality.

14. The device according to claim 13, comprising a further application.

15. A system comprising a plurality of devices according to claim 13, further comprising means for defining said approved bounds of behaviour and at least one building related functionality device whose physical properties is to be controlled by at least one of said devices.

16. The system according to claim 15, wherein said at least one building related functionality device is a valve, an electric motor, a radiator, an elevator, an escalator, an actuator, a contactor, a curtain, a shutter, a blind, a louver, a dimmer, a door or gate lock, a power outlet, a camera, or a turnstile, or any combination thereof.

17. The system according to claim 15, wherein said means for defining said approved bounds of behaviour is disposed to define said bounds according to regulations of European Energy Performance of Buildings Directive.

18. The system according to claim 17, wherein said means for defining said approved bounds of behaviour is arranged to provide an EUBAC mark to said certificate.

19. A system comprising a plurality of devices according to claim 14, further comprising means for defining said approved bounds of behaviour and at least one building related functionality device whose physical properties is to be controlled by at least one of said devices.

20. The system according to claim 16, wherein said means for defining said approved bounds of behaviour is disposed to define said bounds according to regulations of European Energy Performance of Buildings Directive.

* * * * *